United States Patent
Ma et al.

(10) Patent No.: US 7,729,462 B2
(45) Date of Patent: Jun. 1, 2010

(54) FAST RE-SYNCHRONIZATION TECHNIQUES FOR DVB-H SYSTEMS

(75) Inventors: Jun Ma, Irvine (CA); Chaoliang T. Chen, Irvine (CA); Nabil R. Yousef, Foothill Ranch (CA)

(73) Assignee: Newport Media, Inc., Lake Forest, CA (US)

( * ) Notice: Subject to any disclaimer, the term of this patent is extended or adjusted under 35 U.S.C. 154(b) by 766 days.

(21) Appl. No.: 11/615,274

(22) Filed: Dec. 22, 2006

(65) Prior Publication Data

US 2008/0152018 A1   Jun. 26, 2008

(51) Int. Cl.
  *H04L 7/00* (2006.01)
(52) U.S. Cl. ...................................................... 375/357
(58) Field of Classification Search ................. 375/357, 375/362
  See application file for complete search history.

(56) References Cited

U.S. PATENT DOCUMENTS

| | | | |
|---|---|---|---|
| 4,511,919 A | 4/1985 | Forgey et al. | |
| 5,440,266 A | 8/1995 | Ono | |
| 5,625,768 A | 4/1997 | Dye | |
| 5,845,215 A | 12/1998 | Henry et al. | |
| 5,948,105 A | 9/1999 | Skurnik et al. | |
| 6,101,608 A | 8/2000 | Schmidt et al. | |
| 6,507,592 B1 | 1/2003 | Hurvig et al. | |
| 6,590,886 B1 | 7/2003 | Easton et al. | |
| 2002/0086707 A1 | 7/2002 | Struhsaker et al. | |
| 2006/0220901 A1 | 10/2006 | Ginggen et al. | |
| 2007/0019578 A1* | 1/2007 | Meiri | 370/311 |
| 2007/0174047 A1* | 7/2007 | Anderson et al. | 704/207 |
| 2009/0089369 A1* | 4/2009 | Russ et al. | 709/203 |

* cited by examiner

*Primary Examiner*—Don N Vo
(74) *Attorney, Agent, or Firm*—Rahman LLC

(57) ABSTRACT

A system and method of performing re-synchronization for a Digital Video Broadcasting over Handheld (DVB-H) receiver comprises performing a time division multiplexing (TDM) data burst transmission sequence on bits of data received by the DVB-H receiver; performing a data bit re-synchronization sequence on the DVB-H receiver; and reducing a re-acquisition time at every stage of the data bit re-synchronization sequence, wherein the reducing process results in a reduction in the time to perform the re-synchronization for the DVB-H receiver, wherein the reduction in the time to perform the re-synchronization for the DVB-H receiver is greater than one-half of the time required to perform the re-synchronization for the DVB-H receiver absent the reducing of the re-acquisition time at every stage of the data bit re-synchronization sequence.

20 Claims, 4 Drawing Sheets

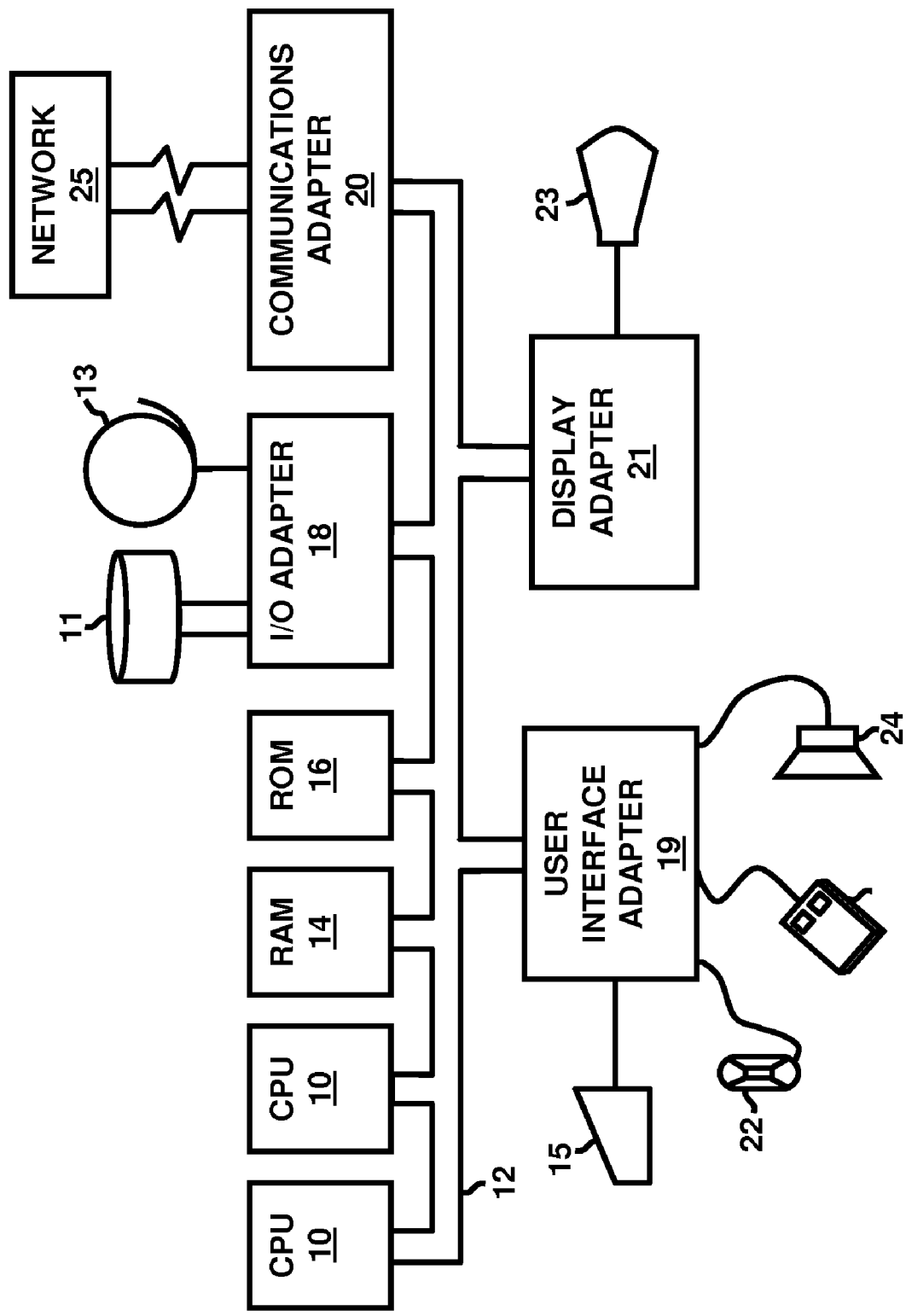

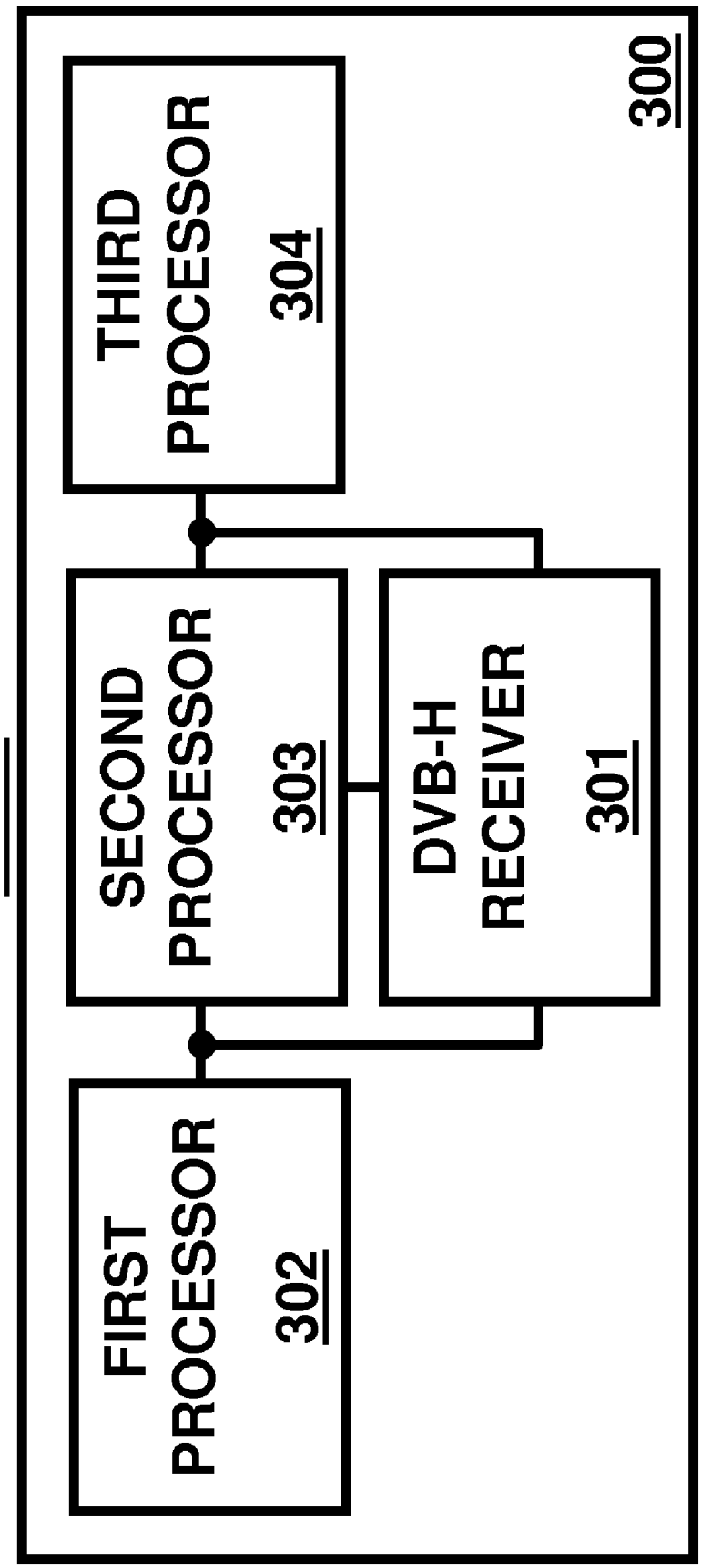

FAST RE-SYNCHRONIZATION TECHNIQUES FOR DVB-H SYSTEMS

CROSS-REFERENCE TO RELATED APPLICATIONS

This application is related to U.S. patent application entitled, "HOST PROCESSOR ASSISTED FAST RE-SYNCHRONIZATION TECHNIQUES FOR DVB-H SYSTEMS," Yousef et al., U.S. Ser. No. 11/615,292 filed on Dec. 22, 2006, the complete disclosure of which, in its entirety, is herein incorporated by reference.

BACKGROUND

1. Technical Field

The embodiments herein generally relate to wireless technologies, and, more particularly, to mobile television (TV) technologies.

2. Description of the Related Art

In Digital Video Broadcasting over Handheld (DVB-H) device systems, time division multiplexing (TDM) based scheme, so called time-slicing, is introduced to reduce the average power consumption in DVB-H receiver. The concept of time-slicing is to send data in bursts using a significantly higher bit rate compared to the bit rate required if the data was transmitted continuously. Within a burst, the time to the beginning of the next burst ($\Delta T$) is indicated. Between the bursts, the data of the elementary stream is not transmitted, allowing other elementary streams to use the bit rate otherwise allocated. This enables a receiver to stay active for only a fraction of the time, while receiving bursts of a request service.

Before the arrival of the next burst, the receiver has to wake up slightly earlier to synchronize some PHY parameters; e.g., carrier and timing offset, transmit parameter signaling (TPS) information to determine the scattered pilots location for channel equalization, etc. The time needed to re-synchronize these parameters determines how much earlier the receiver has to wake up before the arrival of the next burst. The longer the re-synchronization time, the longer the receiver active time is during the burst reception, and thus, the higher the average receiver power consumption is. To reduce the average power consumption, it is essential to reduce the receiver re-synchronization time between bursts.

Generally, fast re-synchronization is essential to the low power consumption for DVB-H receivers. Conventional DVB-H receivers generally take two complete orthogonal frequency division multiplexing (OFDM) frames to acquire TPS information and detect the OFDM symbol number re-synchronization which contributes approximately 49% of the total re-synchronization time. Accordingly, reducing OFDM symbol number detection time and assuming fast scattered plots location is critical to achieve low power consumption in DVB-H receivers. Therefore, there exists a need for a fast re-synchronization technique for DVB-H systems.

SUMMARY

In view of the foregoing, an embodiment herein provides a method of performing re-synchronization for a DVB-H receiver, and a program storage device readable by machine, tangibly embodying a program of instructions executable by the machine to perform a method of performing re-synchronization for a DVB-H receiver, wherein the method comprises performing a TDM data burst transmission sequence on bits of data received by the DVB-H receiver; performing a data bit re-synchronization sequence on the DVB-H receiver; and reducing a re-acquisition time at every stage of the data bit re-synchronization sequence, wherein the reducing process results in a reduction in the time to perform the re-synchronization for the DVB-H receiver.

Preferably, the reduction in the time to perform the re-synchronization for the DVB-H receiver is greater than one-half of the time required to perform the re-synchronization for the DVB-H receiver absent the reducing of the re-acquisition time at every stage of the data bit re-synchronization sequence. Additionally, the data bit re-synchronization sequence may comprise performing an automatic gain control (AGC) lock process; performing a model mode and guard detecting process; performing a frequency offset estimation process; performing a TPS detection process; performing a timing and carrier loop lock process; and performing an equalizer delay process. The method may further comprise initializing an AGC control word to be a last value when the DVB-H receiver enters into a sleep mode of operation.

Moreover, the method may further comprise forcing the mode and guard detection process by utilizing mode and guard values detected from an immediately preceding data burst. Also, the method of may further comprise making the number of OFDM symbol correlations programmable. Furthermore, the method may further comprise bypassing a continuous pilot correlation to find a coarse frequency offset by forcing the coarse frequency offset obtained from an immediately previous data burst. Moreover, the method may further comprise obtaining an OFDM symbol number and a frame number after the TPS detection process. Additionally, the method may further comprise using an on-chip timer to count OFDM symbols during a sleep mode of operation of the DVB-H receiver. Also, the method may further comprise initializing loop integrators with values at a time when the DVB-H receiver enter into a sleep mode of operation.

Another aspect of the embodiments herein provides a system of performing re-synchronization for a DVB-H receiver, wherein the system comprises a first processor adapted to perform a TDM data burst transmission sequence on bits of data received by the DVB-H receiver; a second processor adapted to perform a data bit re-synchronization sequence on the DVB-H receiver; and a third processor adapted to reduce a re-acquisition time at every stage of the data bit re-synchronization sequence, wherein the reducing process results in a reduction in the time to perform the re-synchronization for the DVB-H receiver, and wherein the reduction in the time to perform the re-synchronization for the DVB-H receiver is greater than one-half of the time required to perform the re-synchronization for the DVB-H receiver absent the reducing of the re-acquisition time at every stage of the data bit re-synchronization sequence.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 is a schematic diagram illustrating a computer system used according to an embodiment herein; and FIG. 4 is a schematic block diagram illustrating a system according to an embodiment herein.

DETAILED DESCRIPTION OF PREFERRED EMBODIMENTS

Figure 1:
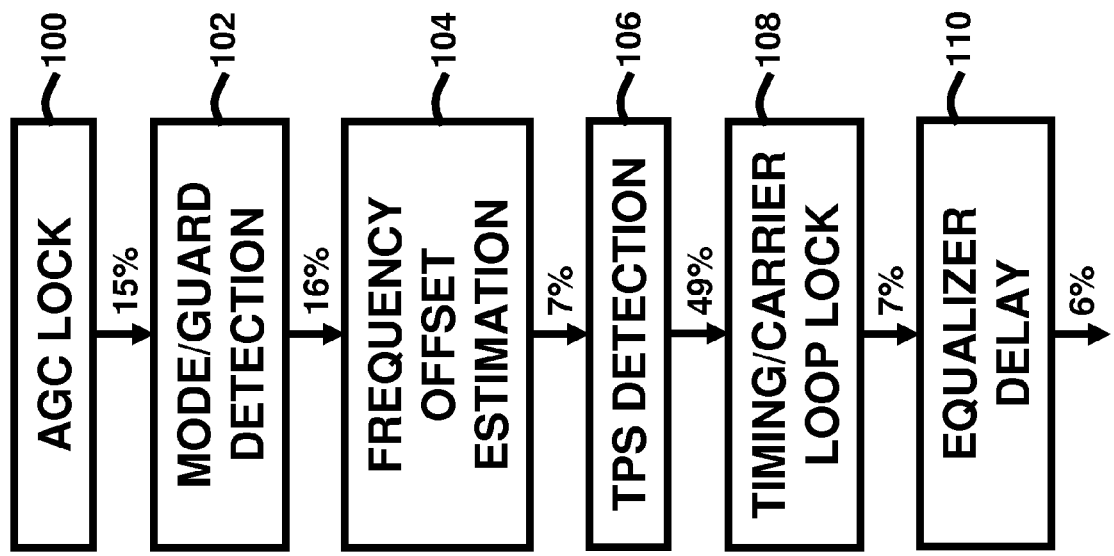
FIG. 1 is a schematic diagram illustrating the re-acquisition sequence of a DVB-H receiver according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need to reduce power consumption in DVB-H receivers. The embodiments herein achieve this by providing a fast re-synchronization technique for DVB-H systems. The fast re-synchronization techniques provided by the embodiments herein significantly reduce the receiver synchronization time between burst via a combination of various techniques to reduce the re-acquisition time at various stages of the re-synchronization process. Referring now to the drawings, and more particularly to FIGS. 1 through 4, where similar reference characters denote corresponding features consistently throughout the figures, there are shown preferred embodiments.

The DVB-H receiver re-acquisition sequence and the percentage of time required for each acquisition stage are shown in FIG. 1. The re-acquisition process goes through the stages of AGC lock 100, mode and guard detection 102, frequency offset estimation 104, TPS detection, timing and carrier frequency tracking loop lock 108, and equalizer delay 110.

During the AGC locking stage 100, the A/D output signal strength is measured and compared with a pre-set threshold. The error signal is used to drive a phase locked loop to adjust the analog variable gain controlled oscillator before the A/D so that the A/D input signal level is set at the correct level to fully utilize the A/D dynamic range. During the mode and guard detection stage 102, the transmission mode and guard information are detected using a time-domain correlation approach, and the fine-frequency offset information is also obtained at this stage 104. During the TPS detection stage 106, the TPS sync word is searched continuously until the TPS is locked and the TPS information is then decoded to program the necessary blocks of the receiver. During the timing and carrier frequency tracking stage 108, the timing and carrier frequency offset errors are detected and then used to drive a digital phase locked loop to adjust the timing and frequency offset. During the equalization stage 110, the channel state information is first estimated and then used to equalize the received data information.

It is seen that the TPS detection occupies approximately 49% of the total acquisition time. Accordingly, the embodiments herein significantly reduce the total re-acquisition time by reducing the re-acquisition time at various stages in the re-acquisition sequence shown in FIG. 1. Reducing the TPS detection time 106 is significant to reducing the re-synchronization time and assuming the minimum power consumption budget. With the fast re-acquisition techniques provided by the embodiments herein, a power saving of approximately 60% is achieved.

Generally, in the embodiments herein re-acquisition time can be shortened by reducing the re-acquisition time at every stage of the re-acquisition sequence shown in FIG. 1. The AGC lock time 102 is shortened by initializing the AGC control word to be the last value when the receiver goes to sleep mode (AGC Lock stage). This occurs because the average input signal level does not change much from burst to burst, and the AGC setting in the previous burst is a good indicator of the input signal level of the current burst. The mode and guard detection time 102 is shortened by forcing the mode and guard since their values will not change from burst to burst (mode/guard detection stage). This occurs because the mode and guard does not change from burst to burst and one could use the previous detected information for the current burst reception. The initial FFT trigger point acquisition and initial fine frequency offset estimation time 104 is shortened by making the number of OFDM symbol correlations programmable (mode/guard detection stage). This occurs because the FFT trigger point acquisition and initial fine frequency offset estimation are obtained through a time domain correlation. By making the number of OFDM symbol correlations programmable, which could be shortened and depends on the channel condition, the acquisition time in this stage can be shortened correspondingly. The continuous pilot correlation to find the coarse frequency offset is bypassed by forcing the coarse frequency offset obtained from the previous burst (frequency offset estimation stage 104). This occurs because the coarse frequency offset will likely not to change from burst to burst. The previous detected coarse frequency offset can thus be used for the current burst.

In order to start OFDM channel equalization, the OFDM symbol number up to a modulo of four symbols is determined to locate the scattered pilot locations. Several approaches may be utilized in accordance with the embodiments herein (TPS Detection stage). For example, a straightforward approach is to obtain the OFDM symbol number and frame number after detecting TPS information. The TPS synchronization word can be used to detect the TPS information which in the worst case can take up to two OFDM frames which correspond to approximately 136 ms in the 8K mode.

Since the TPS information does not change from burst to burst, the entire TPS block (68 OFDM symbols) excluding the fields which contain the OFDM frame number, the cell id, and the BCH code can be used to correlate with the received OFDM frame and locate the synchronization word within the frame, and thus determine the OFDM symbol number. The even and odd frame number can be determined by correlating the synchronization and inverse synchronization words with the received TPS blocks. This approach shortens the detection time to be approximately one OFDM frame period which corresponds to approximately 68 ms in the 8K mode.

Figure 2:
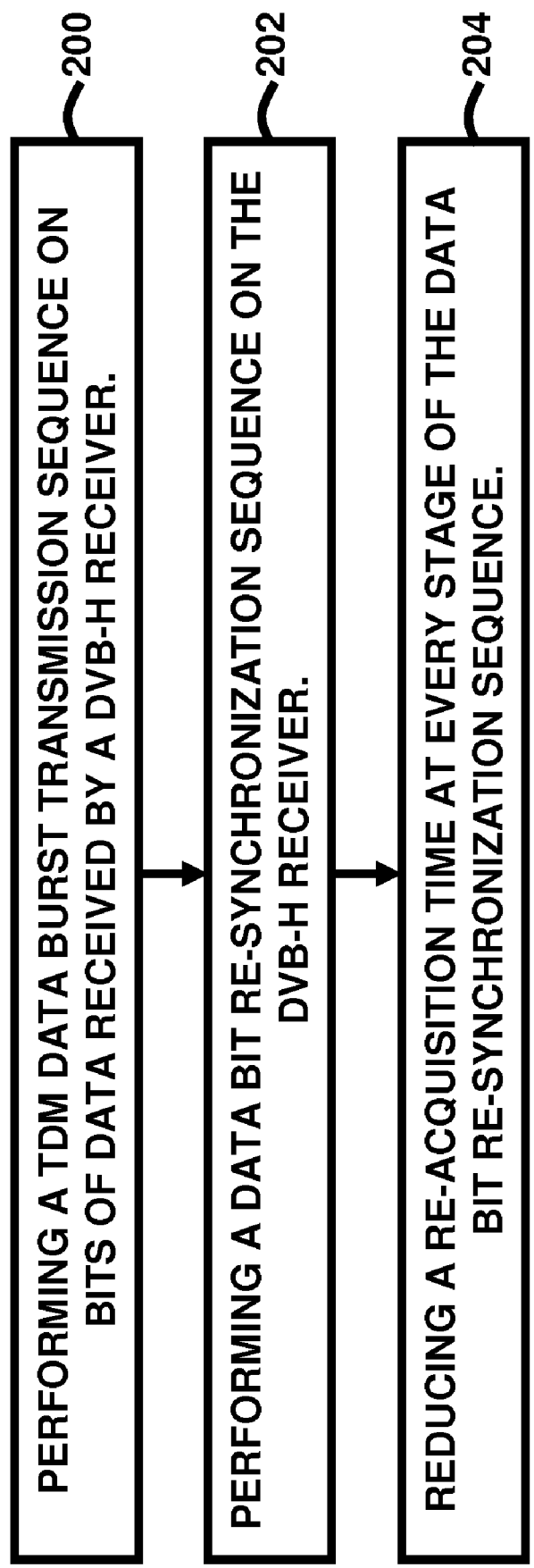
FIG. 2 is a flow diagram illustrating a preferred method according to an embodiment herein.

FIG. 2 is a flow diagram illustrating a method of performing re-synchronization for a DVB-H receiver according to an embodiment herein, wherein the method comprises performing (200) a TDM data burst transmission sequence on bits of data received by the DVB-H receiver; performing (202) a data bit re-synchronization sequence on the DVB-H receiver; and reducing (204) a re-acquisition time at every stage of the data bit re-synchronization sequence, wherein the reducing process results in a reduction in the time to perform the re-synchronization for the DVB-H receiver.

Preferably, the reduction in the time (204) to perform the re-synchronization for the DVB-H receiver is greater than one-half of the time required to perform the re-synchronization for the DVB-H receiver absent the reducing of the re-acquisition time at every stage of the data bit re-synchronization sequence. Additionally, the data bit re-synchronization sequence may comprise performing an AGC lock process; performing a model mode and guard detecting process; performing a frequency offset estimation process; performing a TPS detection process; performing a timing and carrier loop lock process; and performing an equalizer delay process. The method may further comprise initializing an AGC control word to be a last value when the DVB-H receiver enters into a sleep mode of operation.

Moreover, the method may further comprise forcing the mode and guard detection process by utilizing mode and guard values detected from an immediately preceding data burst. Also, the method of may further comprise making the number of OFDM symbol correlations programmable. Furthermore, the method may further comprise bypassing a continuous pilot correlation to find a coarse frequency offset by forcing the coarse frequency offset obtained from an immediately previous data burst. Moreover, the method may further comprise obtaining an OFDM symbol number and a frame number after the TPS detection process. Additionally, the method may further comprise using an on-chip timer to count OFDM symbols during a sleep mode of operation of the DVB-H receiver. Also, the method may further comprise initializing loop integrators with values at a time when the DVB-H receiver enter into a sleep mode of operation.

The embodiments herein can take the form of an entirely hardware embodiment, an entirely software embodiment or an embodiment including both hardware and software elements. Preferably, the embodiments are implemented in software, which includes but is not limited to firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 3. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

FIG. 4 is a system block diagram illustrating a system 300 of performing re-synchronization for a DVB-H receiver 301 according to an embodiment herein, wherein the system 300 comprises a first processor 302 adapted to perform a TDM data burst transmission sequence on bits of data received by the DVB-H receiver 301; a second processor 303 adapted to perform a data bit re-synchronization sequence on the DVB-H receiver 301; and a third processor 304 adapted to reduce a re-acquisition time at every stage of the data bit re-synchronization sequence, wherein the reducing process results in a reduction in the time to perform the re-synchronization for the DVB-H receiver 301, and wherein the reduction in the time to perform the re-synchronization for the DVB-H receiver 301 is greater than one-half of the time required to perform the re-synchronization for the DVB-H receiver 301 absent the reducing of the re-acquisition time at every stage of the data bit re-synchronization sequence.

The embodiments herein provide an on-chip timer to count the OFDM symbols during the sleeping mode. The on chip timer is preferably locked to the correct clock frequency using a timing recovery loop. This occurs because the timing recovery loop is a feedback controlled loop with a timing phase detector to detect the timing phase error, a loop filter to smooth the error, and a numerical controlled oscillator to generate the corrected timing signal. To minimize the drift during the sleep period, the on-chip timer may be used to obtain the correct symbol number, the correct frame number, and the correct FFT trigger point, when the receiver wakes up. Accordingly, this shortens the acquisition time significantly.

The timing and carrier frequency tracking loop convergence time 108 is shortened by initializing the loop integrators with the values at the time when the receiver goes to sleep mode. This occurs because the timing and carrier frequency loops take time to converge to their steady state. The loop state is stored in the loop integrators. By initializing the loop integrators with the values at the time when the receiver goes to sleep mode while most likely the loop already in the steady state mode, the loop convergence time can be shortened. In other words, since the timing and carrier frequencies do not change from one burst to the other, the old values of these frequencies could be used from the previous burst (timing/carrier loop lock stage).

The techniques provided by the embodiments herein may be implemented on an integrated circuit (IC) chip or using printable electronic technologies (not shown). The chip or printable electronic circuit design is created in a graphical computer programming language, and stored in a computer storage medium (such as a disk, tape, physical hard drive, or virtual hard drive such as in a storage access network). If the designer does not fabricate chips or printable electronic circuits or the photolithographic masks used to fabricate chips or printable electronic circuits, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII or CIF) for the fabrication of photolithographic masks, which typically include multiple copies of the chip design in question that are to be formed on a wafer or printed on a suitable substrate. The photolithographic masks are utilized to define areas of the wafer or printable electronic circuits (and/or the layers thereon) to be etched or otherwise processed or printed.

The resulting integrated circuit chips or printable electronic circuits can be distributed by the fabricator in raw wafer form (that is, as a single wafer that has multiple unpackaged chips), as a bare die, or in a packaged form or as individual printed circuits or in a sheet or roll of printed circuits. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip might then be integrated with other chips, discrete circuit elements, and/or other signal processing devices as part of either (a) an intermediate product, such as a mother or daughter-board, or (b) an end product. The end product can be any product that includes integrated circuit chip or chips and/or printed circuits, ranging from toys and other low-end applications to advanced computer products having a display, a keyboard or other input device, and a central processor.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of performing re-synchronization for a Digital Video Broadcasting over Handheld (DVB-H) receiver, said method comprising:
    performing a time division multiplexing (TDM) data burst transmission sequence on bits of data received by said DVB-H receiver;
    performing a data bit re-synchronization sequence on said DVB-H receiver, wherein said data bit re-synchronization sequence comprises synchronization of said DVB-H receiver after DVB-H receiver wake up for receiving a next sequence of a data burst; and
    reducing a re-acquisition time at every stage of said data bit re-synchronization sequence, wherein the reducing process results in a reduction in the time to perform said re-synchronization for said DVB-H receiver.

2. The method of claim 1, wherein said reduction in the time to perform said re-synchronization for said DVB-H receiver is greater than one-half of the time required to perform said re-synchronization for said DVB-H receiver absent said reducing of said re-acquisition time at every stage of said data bit re-synchronization sequence.

3. The method of claim 1, wherein said data bit re-synchronization sequence comprises:
    performing an automatic gain control (AGC) lock process comprising measuring and comparing A/D output signal strength with a pre-set threshold;
    performing a mode and guard detecting process comprising detecting a transmission mode and guard information;
    performing a frequency offset estimation process comprising obtaining a fine-frequency offset information;
    performing a transit parameter signaling (TPS) detection process comprising decoding TPS information to program blocks of said DVB-H receiver;
    performing a timing and carrier loop lock process comprising adjusting timing and frequency offsets based on a digital phased lock loop; and
    performing an equalizer delay process comprising estimating and equalizing channel state information.

4. The method of claim 3, further comprising initializing an AGC control word to be a last value when said DVB-H receiver enters into a sleep mode of operation.

5. The method of claim 3, further comprising forcing said mode and guard detection process by utilizing mode and guard values detected from an immediately preceding data burst.

6. The method of claim 3, further comprising making the number of orthogonal frequency division multiplexing (OFDM) symbol correlations programmable to shorten initial FFT trigger point acquisition time and initial fine frequency offset estimation time.

7. The method of claim 3, further comprising bypassing a continuous pilot correlation to find a coarse frequency offset by forcing said coarse frequency offset obtained from an immediately previous data burst.

8. The method of claim 3, further comprising obtaining an OFDM symbol number and a frame number after said TPS detection process.

9. The method of claim 3, further comprising using an on-chip timer to count OFDM symbols during a sleep mode of operation of said DVB-H receiver.

10. The method of claim 3, further comprising initializing loop integrators with values at a time when said DVB-H receiver enter into a sleep mode of operation.

11. A program storage device readable by machine, tangibly and embodying a program of instructions executable by the machine to perform a method of performing re-synchronization for a Digital Video Broadcasting over Handheld (DVB-H) receiver, said method comprising:
    performing a time division multiplexing (TDM) data burst transmission sequence on bits of data received by said DVB-H receiver;
    performing a data bit re-synchronization sequence on said DVB-H receiver, wherein said data bit re-synchronization sequence comprises synchronization of said DVB-H receiver after wake up for receiving next sequence of data burst; and reducing a re-acquisition time at every stage of said data bit re-synchronization sequence, wherein the reducing process results in a reduction in the time to perform said re-synchronization for said DVB-H receiver.

12. The program storage device of claim 11, wherein said reduction in the time to perform said re-synchronization for said DVB-H receiver is greater than one-half of the time required to perform said re-synchronization for said DVB-H receiver absent said reducing of said re-acquisition time at every stage of said data bit re-synchronization sequence.

13. The program storage device of claim 11, wherein said data bit re-synchronization sequence comprises:
    performing an automatic gain control (AGC) lock process comprising measuring and comparing A/D output signal strength with a pre-set threshold;
    performing a mode and guard detecting process comprising detecting a transmission mode and guard information;
    performing a frequency offset estimation process comprising obtaining a fine-frequency offset information;
    performing a transit parameter signaling (TPS) detection process comprising decoding TPS information to program blocks of said DVB-H receiver;
    performing a timing and carrier loop lock process comprising adjusting timing and frequency offsets based on a digital phased lock loop; and
    performing an equalizer delay process comprising estimating and equalizing channel state information.

14. The program storage device of claim 13, further comprising initializing an AGC control word to be a last value when said DVB-H receiver enters into a sleep mode of operation.

15. The program storage device of claim 13, wherein said method further comprises forcing said mode and guard detection process by utilizing mode and guard values detected from an immediately preceding data burst.

16. The program storage device of claim 13, wherein said method further comprises making the number of orthogonal frequency division multiplexing (OFDM) symbol correlations programmable to shorten initial FFT trigger point acquisition time and initial fine frequency offset estimation time.

17. The program storage device of claim 13, wherein said method further comprises bypassing a continuous pilot correlation to find a coarse frequency offset by forcing said coarse frequency offset obtained from an immediately previous data burst.

18. The program storage device of claim 13, wherein said method further comprises obtaining an OFDM symbol number and a frame number after said TPS detection process.

19. The program storage device of claim 13, wherein said method further comprises using an on-chip timer to count OFDM symbols during a sleep mode of operation of said DVB-H receiver, and wherein said method further comprises initializing loop integrators with values at a time when said DVB-H receiver enter into a sleep mode of operation.

20. A system of performing re-synchronization for a Digital Video Broadcasting over Handheld (DVB-H) receiver, said system comprising:

a first processor that performs a time division multiplexing (TDM) data burst transmission sequence on bits of data received by said DVB-H receiver;

a second processor that performs a data bit re-synchronization sequence on said DVB-H receiver, wherein said data bit re-synchronization sequence comprises synchronization of said DVB-H receiver after wake up for receiving a next sequence of a data burst, and wherein said data bit re-synchronization sequence comprises:
    performing an automatic gain control (AGC) lock process comprising measuring and comparing A/D output signal strength with a pre-set threshold, wherein an AGC control word is initialized to be a last value when said DVB-H receiver enters into a sleep mode of operation;
    performing a mode and guard detecting process comprising detecting a transmission mode and guard information, wherein said mode and guard detection process is forced by utilizing mode and guard values detected from an immediately preceding data burst;
    performing a frequency offset estimation process comprising obtaining a fine-frequency offset information, wherein the number of orthogonal frequency division multiplexing (OFDM) symbol correlations is programmed to shorten initial FFT trigger point acquisition time and initial fine frequency offset estimation time;
    performing a transit parameter signaling (TPS) detection process comprising decoding TPS information to program blocks of said DVB-H receiver;
    obtaining an OFDM symbol number and a frame number;
    performing a timing and carrier loop lock process comprising adjusting timing and frequency offsets based on a digital phased lock loop; and
    performing an equalizer delay process comprising estimating and equalizing channel state information;

a third processor that reduces a re-acquisition time at every stage of said data bit re-synchronization sequence, wherein the reducing process results in a reduction in the time to perform said re-synchronization for said DVB-H receiver; and an on-chip timer that counts OFDM symbols during said sleep mode of operation of said DVB-H receiver, wherein said reduction in the time to perform said re-synchronization for said DVB-H receiver is greater than one-half of the time required to perform said re-synchronization for said DVB-H receiver absent said reducing of said re-acquisition time at every stage of said data bit re-synchronization sequence, wherein a continuous pilot correlation is bypassed to find a coarse frequency offset by forcing said coarse frequency offset obtained from an immediately previous data burst, and wherein loop integrators are initialized with values at a time when said DVB-H receiver enter into a sleep mode of operation.

* * * * *